United States Patent
Evans

(10) Patent No.: US 6,549,324 B2
(45) Date of Patent: Apr. 15, 2003

(54) TRIMMER IRIS FOR USE WITH A DIGITALLY SHAPE-CONTROLLED LIGHTING SYSTEM

(75) Inventor: Nigel Evans, Sutton Coldfield (GB)

(73) Assignee: Light and Sound Design, Ltd., Birmingham (GB)

( * ) Notice: Subject to any disclaimer, the term of this patent is extended or adjusted under 35 U.S.C. 154(b) by 0 days.

(21) Appl. No.: 09/779,196

(22) Filed: Feb. 7, 2001

(65) Prior Publication Data

US 2001/0046079 A1 Nov. 29, 2001

Related U.S. Application Data

(60) Provisional application No. 60/181,483, filed on Feb. 10, 2000.

(51) Int. Cl.[7] ............................................... G02B 26/00
(52) U.S. Cl. ....................................... 359/291; 359/292
(58) Field of Search ................................. 359/290, 291, 359/292, 298; 382/162, 167; 358/109, 506, 518, 519; 345/140, 418, 419; 352/25, 169, 216; 353/297; 362/297; 250/492.22

(56) References Cited

U.S. PATENT DOCUMENTS

| | | | | |
|---|---|---|---|---|
| 4,143,951 A | * | 3/1979 | Suzaki et al. | 352/169 |
| 4,365,875 A | * | 12/1982 | Hirata et al. | 352/25 |
| 4,889,424 A | * | 12/1989 | Saiki | 352/216 |
| 5,379,083 A | | 1/1995 | Tomita | 353/122 |
| 5,597,223 A | * | 1/1997 | Watanabe et al. | 353/97 |
| 5,909,204 A | | 6/1999 | Gale et al. | 345/85 |
| 6,220,730 B1 | * | 4/2001 | Hewlett et al. | 362/297 |
| 6,433,348 B1 | * | 8/2002 | Abboud et al. | 250/492.22 |

* cited by examiner

Primary Examiner—Georgia Epps
Assistant Examiner—Gary O'Neill
(74) Attorney, Agent, or Firm—Fish & Richardson P.C.

(57) ABSTRACT

A variable diameter iris is used to change the pass gate of a shaped image produced by a digital mirror device.

39 Claims, 4 Drawing Sheets

TRIMMER IRIS FOR USE WITH A DIGITALLY SHAPE-CONTROLLED LIGHTING SYSTEM

CROSS-REFERENCE TO RELATED APPLICATIONS

The present application claims benefit of U.S. Provisional Application Ser. No. 60/181,483, filed Feb. 10, 2000.

BACKGROUND

U.S. Patent Applications and co-pending patents by Light and Sound Design describe a stage lighting system which is run by stage lighting luminaries. Each of the luminaries includes a digitally controlled light shape altering device. The specific light shape altering device is the Texas Instruments digital micromirror device or "DMD". This device is digitally controlled to produce shape altering outputs as well as effects on the light.

SUMMARY

The present invention teaches a special trimmer iris, structure of the iris and aspects of use of such a trimmer iris, which produces advantages in a digitally controlled, pixel level device such as a DMD.

BRIEF DESCRIPTION OF THE DRAWINGS

These and other aspects will now be described in accordance with the drawings, in which.

DETAILED DESCRIPTION

Figure 1:
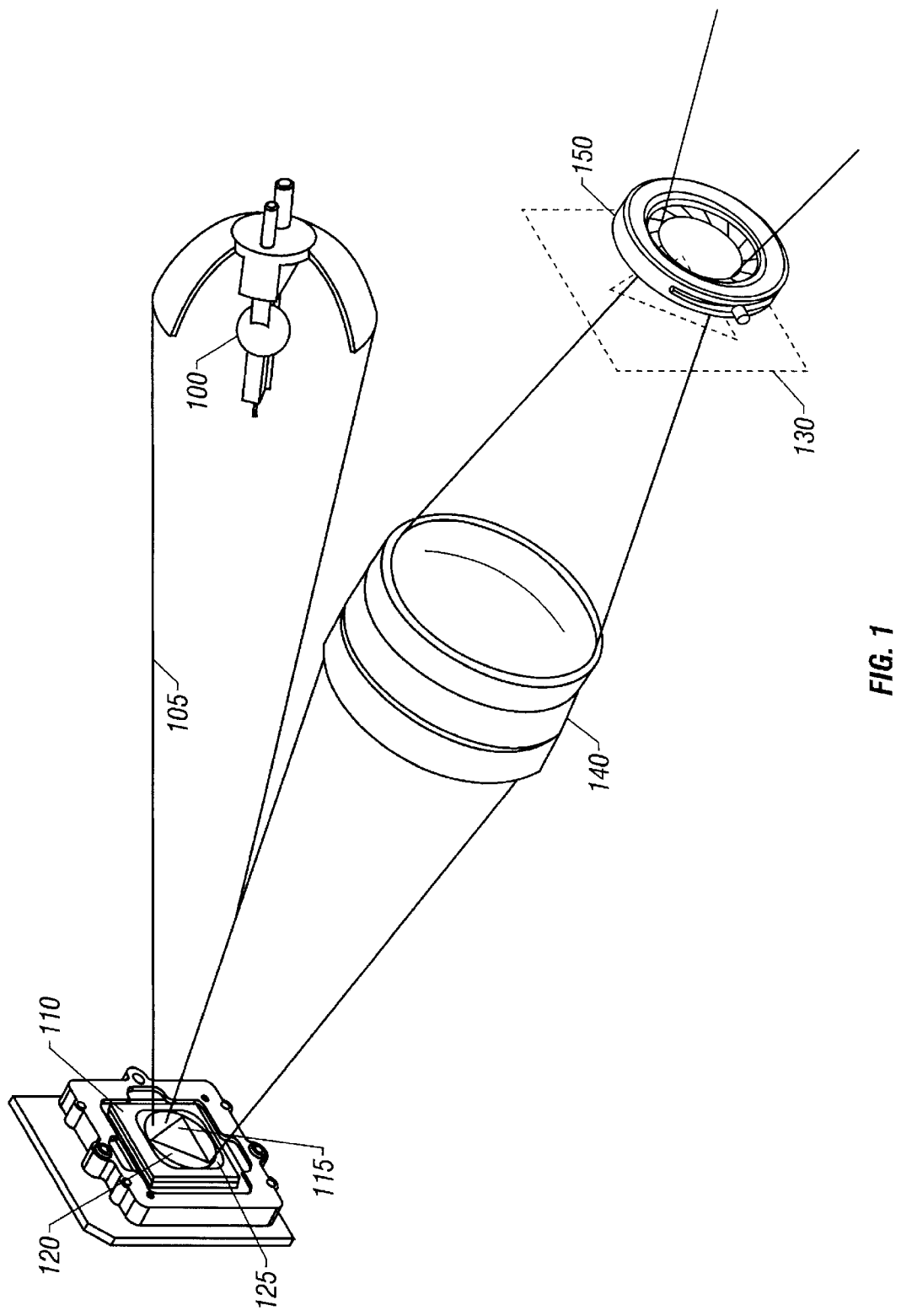
FIG. 1 shows an exploded view of the system.

A basic layout of the system is shown in FIG. 1. A lamp 100 produces a light output beam 105 which impinges on a pixel level controllable device such as a digital mirror device 110. The digital mirror 110 has an active part 115 which represents the image that forms the "gobo" or light passing shape. The image can be simple, e.g., a triangle as shown, or more complex. The image can be "white", wherein it will pass all light (other than quantum inefficiencies), or it can be colored.

Area 120 represents the part around the image, but still within the DMD. This is intended to be "black", i.e., not to reflect any light at all. Due to stray reflection, however, it is viewed as some shade of gray. 125 represents the outer part of the shape; again which is intended to be black, but is not perfect black.

Since the image is formed by digital mirror parts, the edges of the mirrors may refract light and in any case form an imperfect black level.

Our co-pending application describes using a gate to block off light outside the digital mirror.

The present application addresses this issue by using a special trimmer iris 150 in the path of the light beam. The iris has a variable size central element which changes in size to basically track the size of the image on the DMD. The tracking can be automatic. The size of the trimmer iris can be a selected parameter that is set by the lighting designer.

Figure 2:
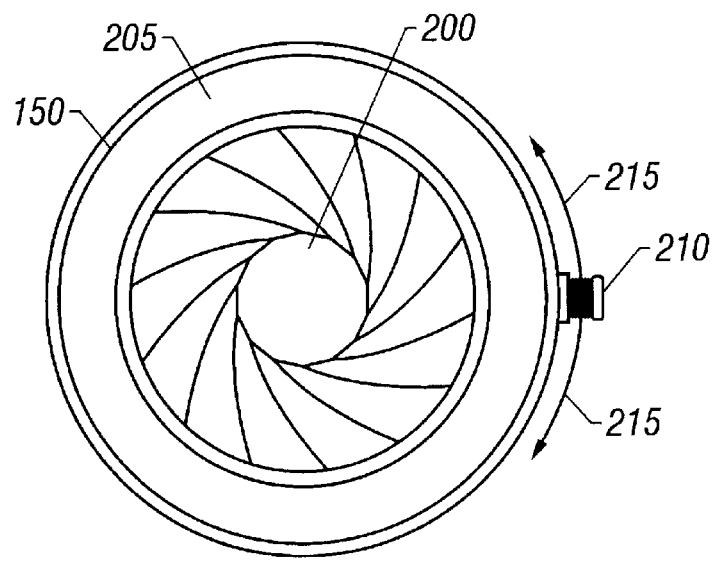
FIG. 2 shows a view of the iris.

FIG. 2 shows an iris that can be used according to the present system. The iris has a variable size central aperture 200, which is open, and a surrounding closed part 205. The size of the central open aperture 200 can be adjusted by moving the driven piece 210 in the directions shown by arrows 215.

Figure 3:
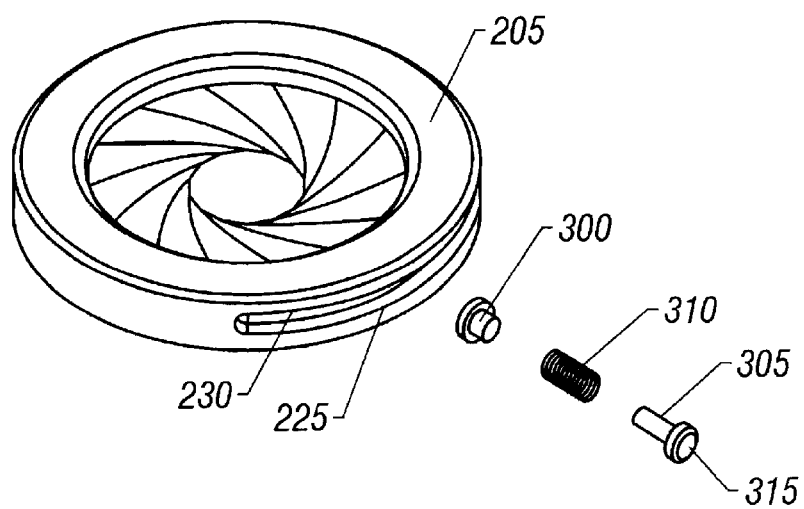
FIG. 3 shows the outer surface of the iris, and an exploded view of the screw device that is pressed against the outer surface.

Further detail on the driven piece is shown in FIG. 3, which shows a spring portion 310 thereon. This spring may be used to hold the driven part more steady. The driven part 210 includes a nylon shoulder 300 pressed against the bearing surface 225 of the iris. The nylon shoulder rests around a screw part 305 which is screwed into a nut held within the bearing surface. Spring part 310 rests on top of the nylon shoulder and is pressed by a screw head 315. The screw head 315 holds the spring 310 between the bottom portion of the screw head 315 and the top portion of the nylon shoulder. In this way, the nylon shoulder is pressed against the bearing surface 225 thereby holding the nylon shoulder 300 down against the bearing surface 225. This keeps pressure against that surface and hence allows the iris to operate more steadily.

Figure 4A:
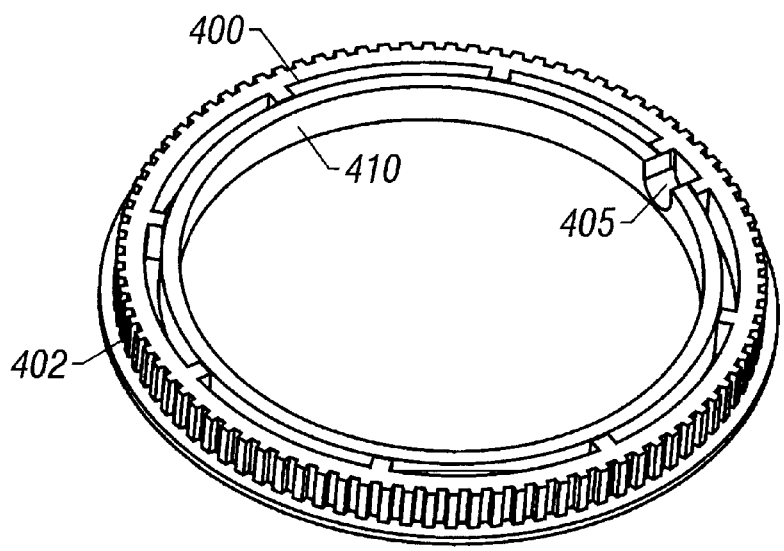
FIGS. 4A and 4B show the bearing surface.
Figure 4B:
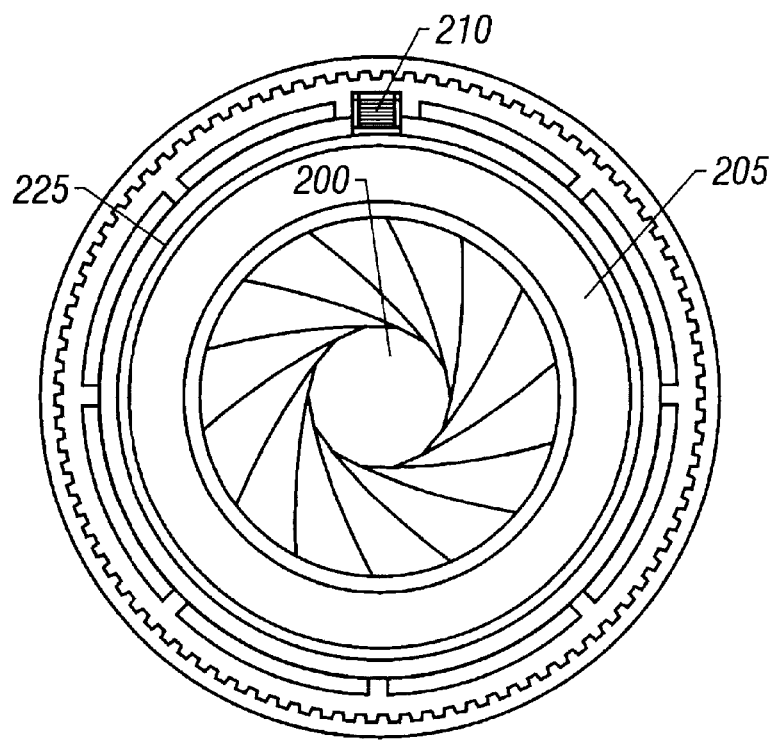

An outer pulley assembly is assembled around the iris. The pulley assembly is shown in FIG. 4A and 4B. The pulley assembly has an outer pulley part 400. Outer surface 402 of the part 400 is notched to accept a corresponding notched belt. Part 400 also includes an inner part 405 that is a cut out in the inner surface of part 400, to accept the driven element 220. The pulley holds the driven element 220 captive within it, and the iris outer surface 225 presses against the inner surface 410 of the pulley assembly. As the pulley assembly rotates, it correspondingly rotates the iris element.

Figure 5:
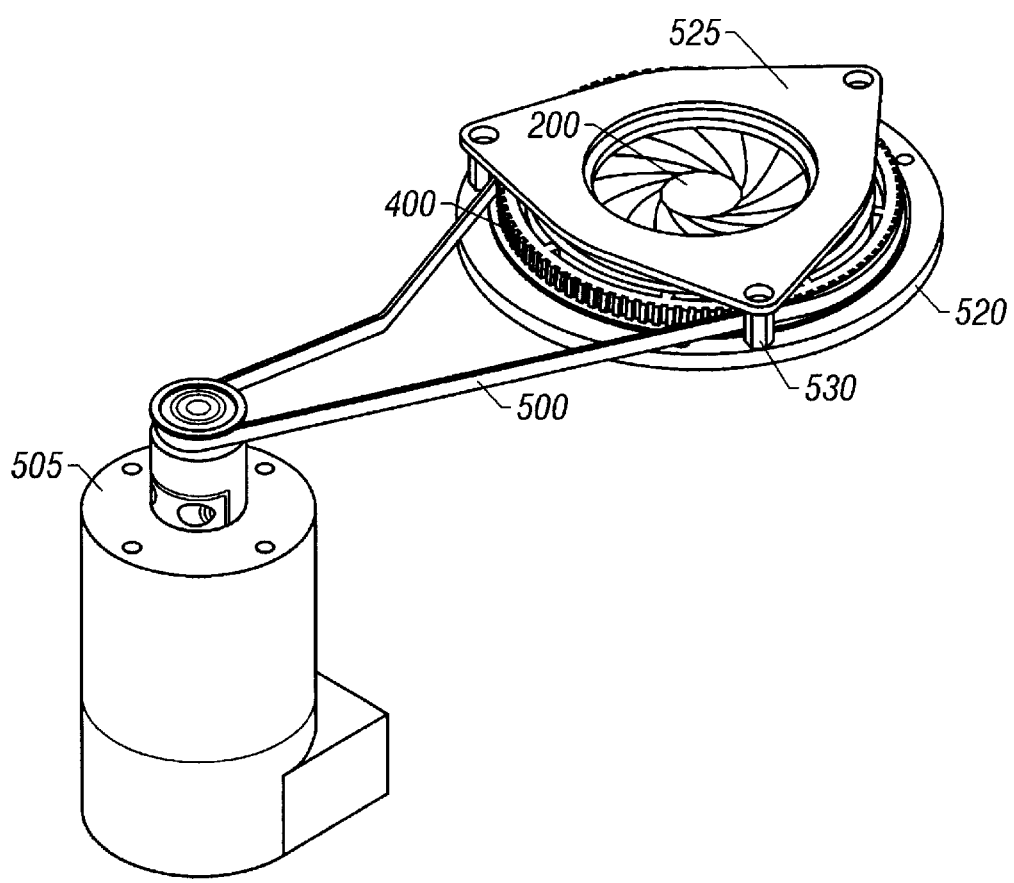
FIG. 5 shows the mounting assembly and the motor.

In operation, the device is held on a location plate as shown in FIG. 5. The location plate holds the pulley assembly and its internal iris in a specified location. A belt 500 is driven by a motor 505. The iris is driven to one end in order to reset and initialize. It can also be driven to the other end, in order to determine the end position also.

The image 115 on the digital mirror device 110 is produced by a processor, shown in FIG. 1 as digital signal processor ("DSP") 160. DSP operates according to images which are stored in memory such as 165. These images have a specified outer size. The image 115 for instance shown in FIG. 1 has an overall outer size defined by the three corners of the triangle. The digital signal processor 160 also runs a program to determine the size of the outer extent of the image. That program is used to produce a specified size for the iris assembly 150. Signal 170 drives the iris assembly to the smallest possible size that it can have in order that still allows the image to pass.

In this embodiment, the size of the mask automatically tracks the image on the DMD.

Other alternatives can also be used. The size of the image can be stored as part of a library of gobos, in the memory 165 associated with each gobo. This stored size can be used to set the iris.

Alternately, the size of the iris can be manually adjusted by the lighting designer as part of the show parameters.

Other embodiments are within the disclosed embodiment.

What is claimed:

1. An apparatus, comprising:
   a lighting system, including a pixel level controllable device, which is electronically controllable to produce a light beam having a variable light shapes and sizes; and
   a controllable aperture device, which is controllable to have different apertures of light passing, placed within a path of said light beam, and controlled to have different apertures based on said different light shapes and light size.

2. An apparatus as in claim 1, further comprising a controller, which automatically controls said pixel level controllable device according to stored information.

3. An apparatus as in claim 2, wherein said pixel level controllable device includes a digital mirror device.

4. An apparatus as in claim 2, wherein said controller automatically determines a size of said light beam to be produced by said pixel level controllable device, and controls said controllable aperture device based on said size which is automatically determined.

5. An apparatus as in claim 2, wherein said controller controls a size of said controllable aperture device based on a user-entered parameter.

6. An apparatus as in claim 1, wherein said controllable aperture device includes an iris having a driven piece whose position determines an open diameter of said iris.

7. An apparatus, comprising:
a lighting system, including a pixel level controllable device, which is electronically controllable to produce a light beam having a variable light shapes and sizes; and
a controllable aperture device, which is controllable to have different apertures of light passing, placed within a path of said light beam, and controlled to have different apertures based on said different light shapes and light size, wherein said controllable aperture device includes an iris having a driven piece whose position determines an open diameter of said iris, and wherein said driven piece includes a bearing surface, and an extending driven part extending from said bearing surface.

8. An apparatus as in claim 7, wherein said extending part includes a spring mounted screw, which is held under pressure by a spring, and pressed against the bearing surface.

9. An apparatus as in claim 8, further comprising a shoulder part, coupled between said screw and said spring, to be held again said bearing surface.

10. An apparatus as in claim 7, wherein said bearing surface is an outer surface of the iris.

11. An apparatus as in claim 6, further comprising a pulley assembly, connected to said iris, to move said iris into a different position.

12. An apparatus as in claim 11, wherein said pulley assembly includes a motor that is rotated to move said pulley assembly in two different directions.

13. An apparatus, comprising:
a pixel level controllable device;
a processor, forming images used for controlling said pixel level controllable device, to automatically calculate a maximum outer size of said images; and
a variable diameter part, controlled based on said maximum outer size of an image that is calculated by said processor.

14. An apparatus as in claim 13, wherein said pixel level controllable device is a digital mirror device.

15. An apparatus as in claim 14, wherein said processor is a digital signal processor.

16. An apparatus as in claim 14, wherein said variable diameter part includes an iris, which has a part that is rotated to change the variable diameter.

17. An apparatus, comprising:
a pixel level controllable device;
a processor, forming images used for controlling said pixel level controllable device, to automatically calculate a maximum outer size of said images; and
a variable diameter part, controlled based on said maximum outer size of an image that is calculated by said processor said variable diameter part including an iris, which has a part that is rotated to change the variable diameter, and wherein said iris includes a movable part, that is moved to change a passing diameter of said iris, an outer bearing surface, and an extending part extending from said an outer bearing surface and connected to said movable part, said extending part including a shoulder part pressing again said bearing surface.

18. An apparatus as in claim 17, further comprising a spring, pressing against said shoulder part, to maintain a pressure of said shoulder part against said outer bearing surface.

19. A lighting apparatus, comprising:
a lighting system, including a processor, programmed to produce information about a plurality of different light shapes, a digital mirror device, controlled by said processor to produce a reflection pattern indicative of a selected one of said light shapes, and a lighting element, producing a light beam which is shaped by said digital mirror device, said processor automatically determining an outer size of a light shape which is selected, and producing a signal that automatically controls said iris based on said size; and
an electronically controllable iris device, controlled to pass a variable diameter of light based on an applied electronic control signal.

20. An apparatus as in claim 19, further comprising a controller, allowing commands to be entered, and wherein said controller allows entry of a command that controls said electronic control signal that controls the diameter of said iris.

21. An apparatus as in claim 19, wherein said size is a smallest possible size that the iris can have in order to still allow the entire image to pass.

22. An apparatus as in claim 19, further comprising storing a library of images to be used with said digital mirror device, and storing a signal indicative of a diameter for said iris device associated with each of said images.

23. An apparatus as in claim 19, wherein said iris device includes a part that is rotated to change a diameter of light that is passed by said iris.

24. A lighting apparatus, comprising:
a lighting system, including a processor, programmed to produce information about a plurality of different light shapes, a digital mirror device, controlled by said processor to produce a reflection pattern indicative of a selected one of said light shapes, and a lighting element, producing a light beam which is shaped by said digital mirror device; and
an electronically controllable iris device, controlled to pass a variable diameter of light based on an applied electronic control signal, said iris device including a part that is rotated to change a diameter of light that is passed by said iris, wherein said part that is rotated includes an extending part, pressing against a bearing surface associated with said iris, and is rotated while pressing again said bearing surface, to change said diameter of light.

25. An apparatus as in claim 24, wherein said extending part includes a shoulder part pressing again said bearing surface, and a spring biasing mechanism, biasing against said bearing surface.

26. A method, comprising:
electronically forming an image to be used to shape the beam of light; and forming a variable diameter passing gate, based on a size of said image.

27. A method as in claim 26, further comprising using said image to shape the beam of light, and using said passing gate to pass only light within said variable diameter.

28. A method as in claim 27, wherein said forming comprises entering a value which is used to vary a diameter of said variable diameter passing gate.

29. A method as in claim 27, wherein said forming comprises automatically determining said variable diameter passing gate based on said size of said image.

30. A method as in claim 27, further comprising storing a library of images, along with a value associated with at least a plurality of said images, that indicates a desired passing gate size, and using said value to form said variable diameter passing gate.

31. A method as in claim 26, wherein said variable diameter passing gate is round.

32. A method, comprising:

forming a beam of light;

shaping said beam of light using a pixel level controllable digitally-controllable device, based on a control signal, to form a shaped beam of light; and truncating a variable portion of said shaped beam of light, based on a shape of the shaped beam of light.

33. A method as in claim 32, wherein said truncating comprises entering a value indicating a desired amount of truncating.

34. A method as in claim 32, wherein said truncating comprises automatically calculating a desired size of a shaped beam of light based on a shape of the beam of light.

35. A method as in claim 32, wherein said forming comprises storing a plurality of beam shapes, and a plurality of truncating sizes respectively associated with said beam shapes, and using a truncating size based on a selected beam shape.

36. An iris, comprising:

a variable diameter part, which provides a variable diameter gate based on a position of a moving part;

an extending portion, attached to said moving part;

a bearing surface, which is fixed relative to said variable diameter part; and a spring biasing portion, providing spring force between said extending portion and said bearing surface.

37. An iris as in claim 36, wherein said extending portion includes a screw.

38. An iris as in claim 37, further comprising a shoulder portion, pressing again said bearing surface.

39. An iris as in claim 38, wherein said spring biasing portion includes a spring, pressing between said shoulder portion and said screw.

\* \* \* \* \*